Oct. 25, 1966    R. D. JORDAN    3,280,951
MICRO-CURRENT POSITION DETECTOR
Filed Jan. 2, 1964    4 Sheets-Sheet 1

INVENTOR.
ROBERT D. JORDAN
BY
Toulmin & Toulmin
ATTORNEYS

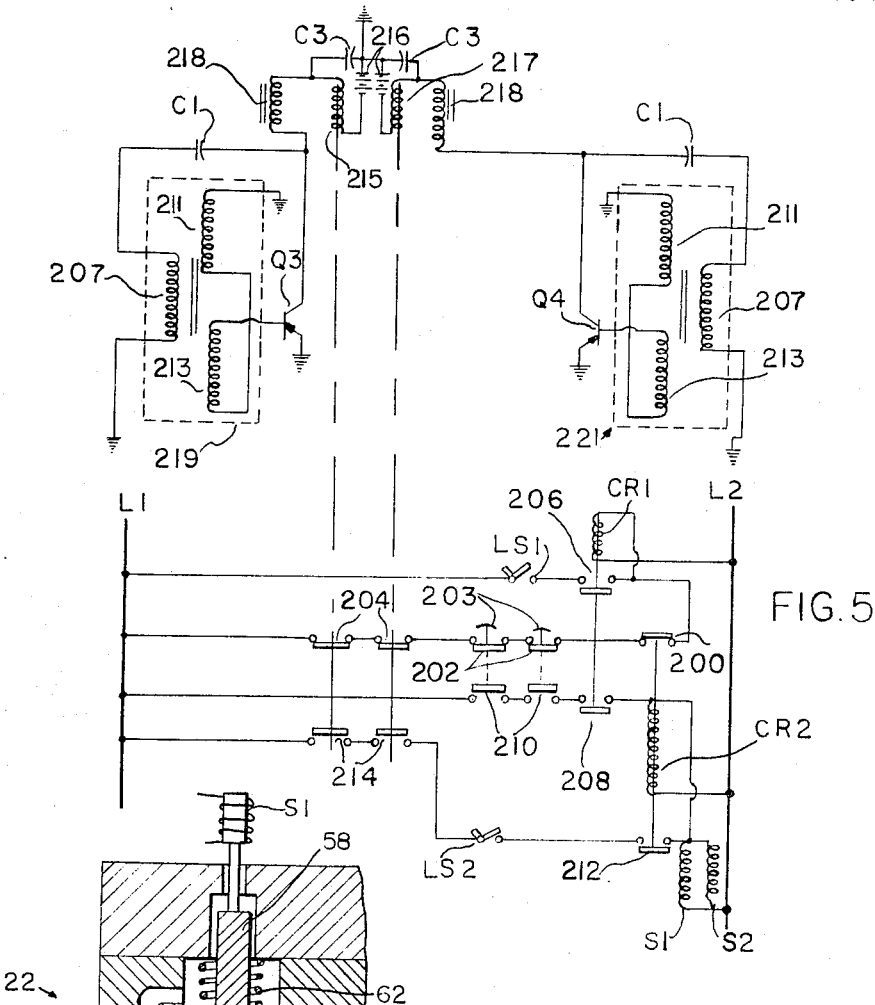
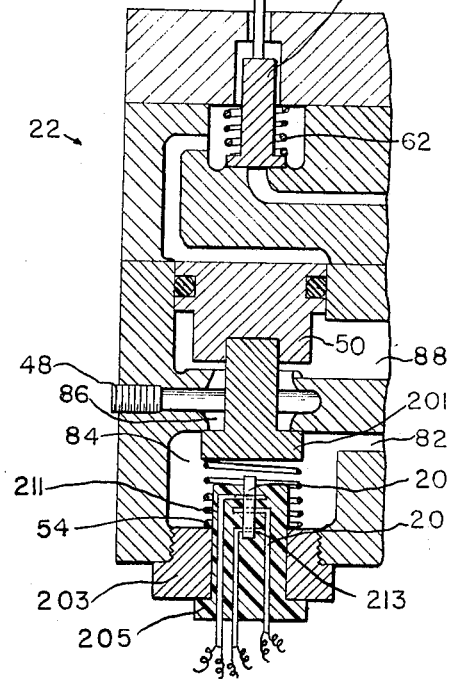

Oct. 25, 1966

R. D. JORDAN 3,280,951

MICRO-CURRENT POSITION DETECTOR

Filed Jan. 2, 1964

INVENTOR.
ROBERT D. JORDAN
BY
Toulmin & Toulmin
ATTORNEYS

Oct. 25, 1966

R. D. JORDAN 3,280,951

MICRO-CURRENT POSITION DETECTOR

Filed Jan. 2, 1964

INVENTOR.
ROBERT D JORDAN
BY Toulmin & Toulmin
ATTORNEYS

United States Patent Office 3,280,951
Patented Oct. 25, 1966

3,280,951
MICRO-CURRENT POSITION DETECTOR
Robert D. Jordan, St. Marys, Ohio, assignor to Minster Machine Company, Minster, Ohio, a corporation of Ohio
Filed Jan. 2, 1964, Ser. No. 335,125
10 Claims. (Cl. 192—144)

This invention relates to valves and controls therefor, and is particularly concerned with such valves and controls as applied to valve mechanism for controlling the operation of a press or the like through actuation of the clutch and brake thereof. This application is a continuation-in-part of my co-pending application Ser. No. 53,522, filed September 1, 1960, now Patent No. 3,135,289 and entitled "Micro Current Position Detector."

Most mechanical presses and press brakes and the like are operated by utilizing a clutch and brake combination which alternately couples the crankshaft of the device to the flywheel and drive train and to the press frame. It is essential in arrangements of this nature for the valves to be absolutely positive in operation to avoid repeating of the press or press brake and to prevent accidental tripping thereof. Either of these conditions could lead to serious damage of the machine or dies therefor or injuries to the workmen operating the press or press brake.

It is a particular object of the present invention to provide a greatly improved valve arrangement and control therefor for circumstances of this nature.

A still further object of this invention is the provision of a dual valve arrangement for controlling clutches and brakes of presses and press brakes and the like in which the failure of either valve to operate properly will prevent the press or press brake from cycling.

Still another object of this invention is the provision of a detecting device for detecting the positions of the valves which will in no way interfere with the operation of the valves.

Another object of this invention is the provision of a detecting arrangement for detecting the positions of valves, particularly in a dual or tandem valve arrangement wherein the movable portion of the valve itself forms a portion of the detecting circuit or is a control element for the control circuit.

A still further object of this invention is the provision of a detecting arrangement for detecting the positions of the valves, particularly in a dual or tandem valve arrangement for presses or press brakes or like machines in which the detecting means is substantially unaffected by vibration or shocks caused by operation of the machine or operation of the valves themselves.

Still another object of this invention is the provision of a detecting device for detecting the positions of valves which can be placed directly in a pressurized chamber without interfering with the operation of the device.

These and other objects and advantages will become more apparent upon reference to the drawings in which:

FIGURE 3 is a fragmentary view through a portion of the tandem valve showing one of the valves and the pilot valve therefor at enlarged scale and also showing differential transformer that is influenced by the movement of the main valve member;

FIGURE 5 is a diagrammatic representation of an electric control circuit for the present invention having the differential transformer of FIGURES 3 and 4 connected into the circuit;

Figure 1:
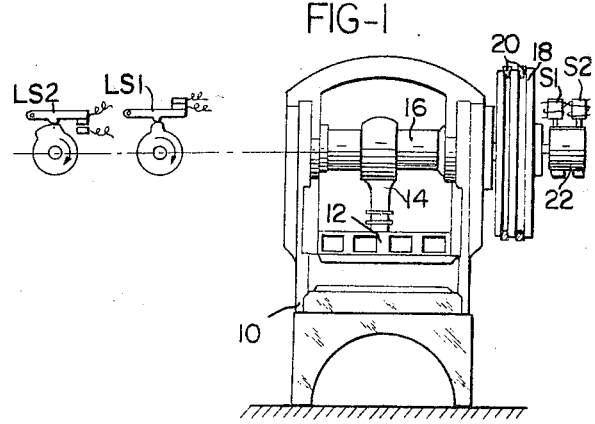
FIGURE 1 is a diagrammatic view showing a simple press structure adapted for being controlled by the valve structure of the present invention.

Referring to the drawings somewhat more in detail, the press in FIGURE 1 comprises a frame 10 in which there is reciprocably mounted a platen 12 that is connected by a connecting rod 14 with a crankshaft 16 rotatably supported in the press frame. Crankshaft 16 supports a flywheel 18 driven by belts 20, or by any other suitable drive means such as a geared transmission leading to a drive motor.

Associated with the crankshaft and flywheel is a dual valve structure 22 consisting of a valve body means and valve member means movable therein for controlling the connection of the crankshaft to the flywheel and to the press frame.

Figure 2:
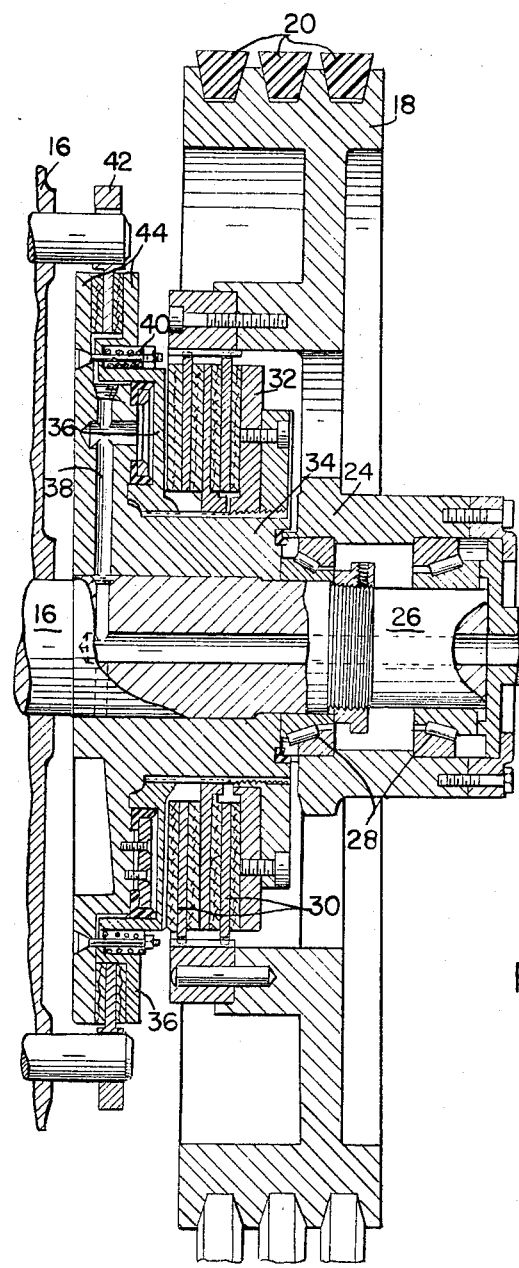
FIGURE 2 is a vertical section through the flywheel of the press of FIGURE 1 and showing in section the clutch and the brake and the tandem valve arrangement together with a portion of the valve position detecting circuit.

The said connection of the crankshaft to the flywheel to cause the crankshaft to rotate or to the frame of the press to hold the crankshaft stationary is accomplished by clutches and brakes that are illustrated in FIGURE 2.

In FIGURE 2 it will be seen that flywheel 18 has a hub portion 24 supported on the projecting end 26 of crankshaft 16 by the antifriction bearings 28. The flywheel has attached thereto, preferably by spline means, clutch plates 30 and these plates are interleaved with clutch plates 32 splined to a hub member 34 that is fixed to the crankshaft.

Piston 36 is carried by hub portion 34 and is adapted for being moved rightwardly by a supply of pressure fluid thereto via conduit means 38 when it is desired to clamp the aforementioned clutch plates together to connect the flywheel with the crankshaft to drive the crankshaft in rotation.

When the piston is relieved by connecting conduit 38 to exhaust, spring means 40 urges the piston in the opposite direction and at this time a brake plate 42 carried on the press frame 10 is clamped between the brake plates 44 carried by hub portion 34 and the crank-shaft is brought to a halt and held stationary. The brake plates and clutch plates have friction elements interposed therebetween to enhance the gripping action thereof as the aforementioned piston is operated in its opposite directions.

Conduit means 38 extends through the crankshaft and through a rotary coupling 46 to the service port 48 of the aforementioned valve structure 22. This valve structure comprises a pair of valve poppet members 50, 52, urged upwardly by their respective springs 54 and 56 and adapted for being moved downwardly by a supply of pressure to the upper ends thereof by actuation of their respective pilot valves 58 and 60. The pilot valves have the springs 62 and 64 respectively urging the pilot valves toward closed position and also have the actuating solenoids or electric operators S1 and S2, respectively, which are energized for opening the pilot valves.

The supply of pressure fluid to valve 22 is by way of a conduit 66 connected to the inlet port 68 of the valve. A branch conduit 70 leading from conduit 66 affects a continuous supply of the pressure fluid to the conduit means 72 in the valve body that leads to the two pilot valves and which conduit means is normally closed off by the pilot valves when the pilot valves are closed.

Each pilot valve when opened connects conduit means 72 via the conduit means 74 with the upper face of the pertaining one of the dual pilot valve poppet members for moving the said poppet members downwardly against the bias of their springs.

The dual poppet valve members control the connection between inlet port 68 and service port 48 of the valve 22 and also control communication between the service port 48 and the exhaust port 76 of the valve.

Within the valve 22 there is a chamber 78 that communicates with inlet port 68 and in which chamber spring 56 of the poppet valve member 52 is located. This chamber communicates by way of a port 80 with a passage 82 in the valve leading to a chamber 84 associated with poppet valve 50 and corresponding to chamber 78 above referred to. Chambers 78 and 84 and the interconnecting passage 82 form an inlet passage leading from inlet port 68 to service port 48.

Chamber 84, in turn communicates by way of a port 86 with the aforementioned service port 48. Each of the valve poppet members, when in its upper position as illustrated in FIGURE 2, closes its respective port leading from the said chambers 78, 84 thus preventing any communication between inlet port 68 and service port 48. It will also be evident that the poppet valve members are arranged in series in the inlet passage and that therefore, both of the valve poppet members must be shifted downwardly in order to establish the aforementioned inlet passage and thus establish communication between the valve inlet port and the valve service port for supplying pressure to conduit means 38 in the crankshaft to actuate the press clutch.

The aforementioned exhaust port 76 leads from a chamber 88 in the valve and in which chamber is located the upper portions of the poppet valve members. This chamber also has a port 90 associated with poppet valve 50 communicating with service port 48 and a port 92 associated with poppet valve member 52 that communicates with the previously mentioned passage 82. There are thus two parallel arranged exhaust passages leading from the service port 48 to exhaust port 76.

The poppet valve members, when moved downwardly by a supply of pressure to their upper ends as brought about by opening of their respective pilot valves, will engage and close their respective ports 90, 92.

It will be apparent that the exhaust chamber 88, and therefore the exhaust port 76, will be connected with the service port 48 of valve 22 when either of the poppet valve members are in their upper positions so that the conduit means 38 will be exhausted when either or both of the poppet valve members are in their upper positions to cause the press brake to be set.

Figure 4:
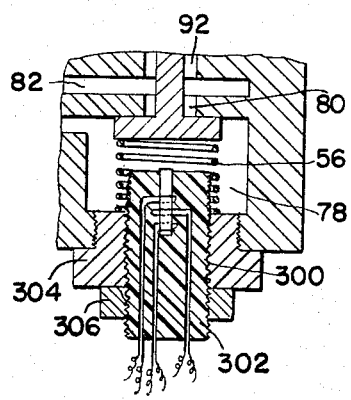
FIGURE 4 is a view showing how the differential transformer could be adjustably mounted in the valve body to regulate the response thereof to movement of the main valve member.

Turning now to FIGURES 3, 4 and 5, there is shown therein more or less diagrammatically an arrangement for detecting the position of the valve poppet members by the positional relation thereof to an element, which may, for example, be a differential transformer. With an arrangement of this nature no actual contacting of a switch or plunger or in fact, the making or breaking of a circuit or the like is necessary in order to determine the positions of the valve poppet members.

In FIGURE 3 there is shown a fragment of the dual poppet valve with the lower end of one of the valve members indicated at 201. In the plug 203 of the bottom of the valve body is an insulating member 205 and mounted in the insulating member is a differential transformer consisting of a bar core 207 having primary winding 209 thereon located between the secondary windings 211 and 213 which are wound in opposition.

When the valve poppet member is in its upper position, the net coupling between the primary winding 209 and the total secondary winding consisting of the two secondary windings 211 and 213 in opposing series will be zero. However, movement of the valve poppet member, which may be of magnetic material, downwardly will disturb the magnetic balance in the core and will increase the coupling of the primary to the secondary winding 211 and the resulting unbalance can be employed in a detector circuit for indicating the position of the poppet member. Specifically, the detector circuit for each valve includes the differential transformer pertaining thereto, a transistor controlled by the transformer, and a relay controlled by the transistor and having blade means in the control circuit described hereinafter.

A combined detector and control circuit employing differential transformers of the nature referred to is illustrated more or less diagrammatically in FIGURE 5.

In FIGURE 5 the power lines are indicated at L1 and L2. Connected between these lines is the coil of a relay or contactor CR1, with the circuit through the coil extending through a normally closed blade 200 of a second relay or contactor CR2 and thence through the normally closed blades 202 of a pair of push button stations 203 and then through the normally closed blades 204 of relays 215 and 217 that are a part of the valve position detector circuits referred to above.

The coil of CR1 also has a holding circuit extending through the normally open blade 206 of the relay and a limit switch LS1 associated with the press which is closed when the press is at the top of its stroke and which opens after the press commences its down stroke.

The coil of relays CR2 is connected between power lines L1 and L2 in a circuit extending through a normally open blade 208 of relay CR1 and normally open blades 210 of the aforementioned push button stations 203. Connected in parallel with the coil of relay CR2 are the aforementioned valve solenoids S1 and S2.

A holding circuit for the coil of relay CR2 is established through a normally open blade 212 of relay CR2 and a limit switch LS2 which is open when the press is at the top of its stroke and which closes when the press commences its stroke, and prior to the opening of LS1 and through the normally open blades 214 of the aforementioned relays 215 and 217.

Each of the valves of the detector valve arrangement has a position detector circuit associated therewith. There are thus two identical detector circuits as illustrated in FIGURE 5, one pertaining to each poppet valve member and to each of the relays referred to above.

In the circuit of FIGURE 5 the differential transformers for the two poppet valve members are indicated generally at 219 and 221. Each of these transformers is connected to an oscillating circuit with transistors Q3 and Q4, respectively. Each oscillating circuit has a battery 216, a coil 218, one of the coils of relays 215, 217, a condenser C1, and a trimmer condenser C3.

By selecting the correct ratio of winding turns and the current amount of circuit disturbance for a given transistor gain, the entire circuit will oscillate, with the frequency of oscillation depending upon the number of turns of the primary winding of the respective differential transformer and the capacity of condenser C1 in each circuit.

Before oscillation the transistors Q3 and Q4 are operating at cut-off, and only leakage collector current flows in the pertaining relay coil 215, 217. After oscillation begins, indicating that the respective valve poppet member is shifted downwardly, a much greater current flows, By properly designing the circuit constants this increased current can be made large enough to operate the respective relay 215, 217. Operation of the relays controls the control circuit by way of blades 204 and 214.

Thus when a valve poppet shifts to open position, the relay in the pertaining detector circuit is energized, and when the valve poppet is in the closed position, the pertaining relay is de-energized.

With the machine at the top of the stroke, LS1 is closed and LS2 is open. When the electrical mains L1 and L2 are energized, CR1 will energize through the normally closed contacts of the valve position detector relays in series, the normally closed contacts of the manual switches, and normally closed blade 200 of relay CR2. When energized, CR1 will hold through its own normally open blade 206 and rotary limit switch LS1.

With CR1 energized, and self holding, the manual switches may be depressed. CR2 and the valve solenoids will then be energized through the normally open contacts 210 of the manual switches and normally open blade 212 of CR1 in series.

With the valves shifted to open position, the position detector relays are now energized, with their normally open blades 214 closed, and the press clutch is engaged by air supplied thereto through the poppet valves. As the crankshaft turns, LS2 will close at a predetermined point, holding CR2 and the valve solenoids energized through the normally open blades 214 of the valve position detector relays 215, 217, LS2 and normally open but now closed, blade 200 of CR2 in series. No holding path is formed if either of the valve detector relays has not operated. This is a protective feature of the circuit provided solely to assure that the detector circuits are both working, since it was previously necessary to have both valves actually shifted before the clutch was supplied with air.

It is necessary that the holding circuit for relay or contactor CR2 has continuity; if it does not, the machine will stop when the operator releases the manual switches or, even if these are held depressed, the machine will stop when LS1 opens de-energizing CR1, which opens the manual switch circuit originally used to energize CR2 and the valve solenoids.

When the end of the stroke is approached, LS2 opens to de-energize CR2 and the valve solenoids, causing the valve poppets to shift back to normal position, and the valve position detector relays to be de-energized.

Then, relay CR1 again has an energizing circuit established therefor, and the cycle may be re-enacted.

The use of a differential transformer is of merit because it can be placed directly in a pressure chamber and it is not influenced by changes of pressure therein. The transformer can be made quite small, for example, with 1/16" x 1/16" x 3/8" magnetic bare core. The windings are placed on this core in the manner described and this small unit can then be installed directly within the pressure chamber if so desired.

It will be understood that the illustration of the differential transformer in FIGURE 3 is diagrammatic and the proportions thereof have been distorted in order to make a clear showing of the bar core and the several windings thereon.

From the foregoing description of a cycle of operation it will be apparent that the use of the arrangement of the present invention makes for an unusually safe press operation system. A dual valve press operation system without a valve position detector assumes that there will be no more than a single failure in any given press cycle. Since all parts of the valve device are inherently free of failure, only under rare circumstances will even a single failure occur.

Accordingly, the probability of multiple failures, as must occur with the present invention to cause a failure of the proper operation of the press, is extremely, even infinitesimally, small.

It will be understood that the circuit of FIGURE 5 is exemplary of many different control circuits that could be utilized employing the differential transformer means. The differential transformers thus constitute means for introducing a disturbance into, or for changing the conditions, impedance, for example, in a circuit in response to movement of the valve members and any circuit capable of amplifying such disturbance or change to create sufficient current to operate the detector relays.

The differential transformer of FIGURE 3 can be adjustably mounted to control the sensitivity thereof with respect to movement of the main valve member as illustrated in FIGURE 4. In FIGURE 4 the thread means 300 permit axial adjustment of the body 302 of the differential transformer axially within the cap member 304 in which the differential transformer is mounted. A lock nut 306 is employed for locking the transformer in its adjusted position.

Figure 6:
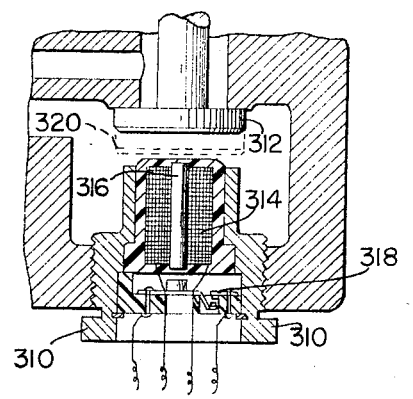
FIGURE 6 is a diagrammatic view showing how a proximity switch could be employed somewhat in the same manner as the differential transformer is employed.

FIGURE 6 shows an arrangement wherein, within the cap 310 that is in alignment with main valve member 312, there is a coil 314 and core 316 in the coil forming an electromagnet. At the lower end of the electromagnet there is a switch blade 318 forming a part of a switch and with the switch normally open. Energization of coil 314 is so adjusted that when the poppet valve member 312 is in its upper position, the switch remains open. However, when the poppet valve member moves to its lower position as indicated by dot dash outline 320, the influence of the electromagnet on the switch blade 318 is increased, and this will pull the switch closed.

Upon return of the poppet valve member 312 to its upper position, switch blade 318 will again drop and the switch will be open.

The proximity switch arrangement of FIGURE 6 can be utilized in a circuit substantially identical with that of FIGURE 5 except the detector relays will be under the control of the proximity switches rather than under the control of the oscillating circuits as shown in FIGURE 5.

Figure 7:
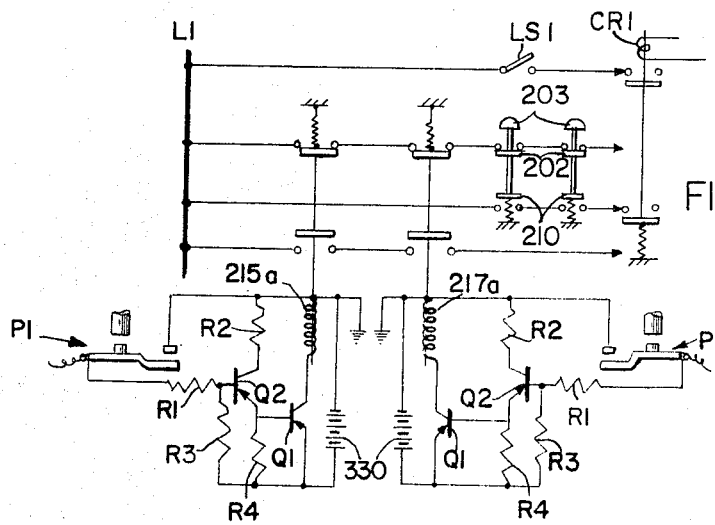
FIGURE 7 is a showing of a portion of the circuit of FIGURE 5, but illustrating the manner in which the detecting relays are arranged for being controlled by the proximity switch of the arrangement of FIGURE 6.

In FIGURE 7 only that portion of the circuit has been illustrated which differs from that of FIGURE 5. The detector relays of FIGURE 7 are shown at 215a and 217a, and these relays have their blades connected in the control circuit in the same manner as has already been described in connection with the FIGURE 5 circuit. The relay coils in FIGURE 7 are adapted for energization by the battery means 330 and in series with the battery means, and each relay coil is a first transistor Q1 and each transistor Q1 is, in turn, cascaded with a second transistor Q2 and transistor Q2 is, in turn, connected with the pertaining one of the proximity switches P1, P2.

More specifically, one side of each proximity switch is connected through a resistor R1 with the base of pertaining transistor Q2. A resistor R3 is also connected between the base of each transistor Q2 and one side of battery means 330. The same side of the battery means is connected through a resistor R4 with the emitter of transistor Q2 and with the base of transistor Q1. The emitter of transistor Q1, is, in turn, directly connected with the said one side of the battery means 330.

The other side of battery means 330 is connected to ground and also with the other side of the pertaining one of the proximity switches P1, P2. Still another resistor R2 is connected between the other side of the battery means, namely, ground potential and the collector of each of the transistors Q2. Still further, each of the coils of relays 215a, 217a have the end opposite the end that is connected to ground connected with the collector of the pertaining one of transistors Q1.

Both of the detector circuits are identical and the same reference numerals have been applied thereto in FIGURE 7.

As to the operation of the FIGURE 7 circuit, the transistors are normally at cut off, since the base of each transistor Q2 is at the same potential as the emitter thereof. Thus, only leakage current is present in the collector-emitter circuit of transistors Q1 and Q2.

When either of the proximity switches are closed, however, current flow is attached largely through the base circuit of transistor Q2, since resistors R3 and R4 are relatively large compared to the emitter-base impedance of the two transistors in series.

The current referred to is of very small magnitude, on the order of about 100 micro-amperes and of relatively low voltage, about 12 volts, and is multiplied by the amplification characteristics of transistor Q2 so that the collector-emitter circuit current of transistor Q2 may be approximately 5 milliamperes. Substantially all of this current is obtained through the base of transistor Q1 because its emitter-base impedance is small compared to the resistance of R4. Transistor Q1 further amplifies the current to an amount sufficient to operate the relay coil.

Thus, when a valve poppet shifts to open position, the pertaining detector relay is energized and, when the valve poppet shifts to closed position, the pertaining detector relay is de-energized. In all other respects the arrangement of FIGURE 7 operates the same as the arrangement of FIGURE 5.

Figure 8:
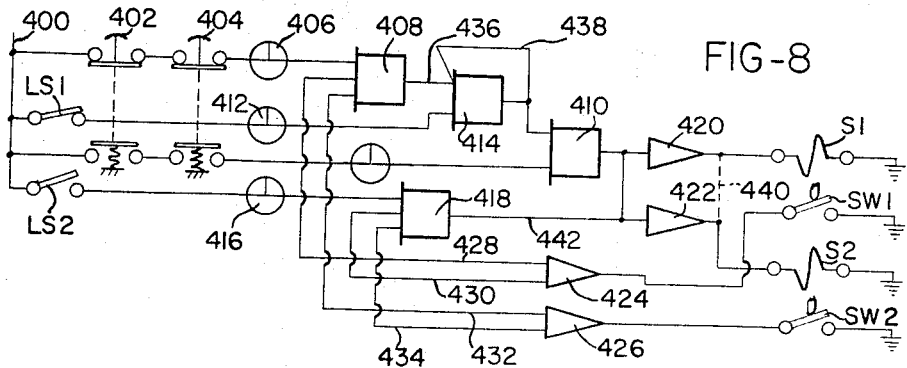
FIGURE 8 is a schematic representation of a control circuit according to the present invention employing logic elements.
Figure 9:
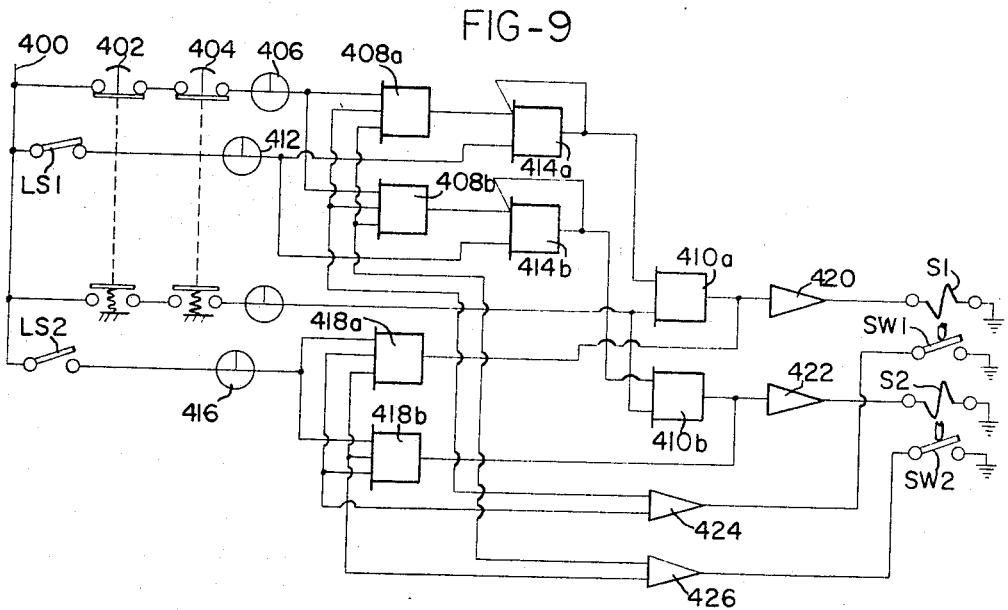
FIGURE 9 is a view showing a circuit similar to that of FIGURE 8 but having a completely dual system.

The circuits of FIGURES 8 and 9 show how logic elements could be employed to arrive at an operative control circuit still characterized by the fact that only minute currents are passed through the valve control switch and also embodying the features that both valves must operate properly in both opening and closing directions during each cycle before the press can be re-cycled.

In FIGURE 8, the valve solenoids are indicated at S1 and S2 and the valve switches are indicated at SW1 and SW2. These switches correspond to the switches previously described that are operated in response to movement of the main valve member.

In FIGURE 8, there is a wire 400 representing a source of voltage for supplying the logic components of the circuit which are controlled by the manually operated switches of the circuit and the valve operated switches.

The manual switches that are actuated by the press operator are indicated at 402 and 404, and these switches each have a manually closed blade, which blades are connected in series and also in series with a converter schematically shown at 406 which converts a high direct current voltage to "on" voltage for a logic component at 408 which is an "and" component.

Each of switches 402, 404 also has a normally open blade thereon, these last-mentioned blades being connected in series and leading to one input terminal of another "and" component 410.

Limit switch LS1, which is closed when the press is at the top of its stroke, and which opens after an operative cycle of the press starts, is connected by way of another converter 412 with one of the input terminals of still another "and" component 414.

The other press operated limit switch LST which is normally open at the top of the press stroke, and which closes after the press commences its operative cycle, is connected via still another converter 416 with one of the input terminals of still another "and" component 418.

The output side of component 410 is connected so that an output therefrom will turn on the amplifiers 420 and 422 pertaining to the valve solenoids S1 and S2. These amplifiers can also be maintained in their "on" position by a signal from the output side of the "and" component 418.

The valve switches SW1 and SW2 are connected with circuit elements 424 and 426 respectively, and each of these elements has two output terminals, one of which supplies "on" voltage when the pertaining valve switch is open and the other of which supplies "on" voltage when the pertinent valve switch is closed. More specifically, line 428 leading from component 424 has "on" voltage supplied thereto when switch SW1 is open, whereas line 430 leading from component 424 has "on" voltage supplied thereto when switch SW1 is closed. Similarly, when switch SW2 is open, line 432 leading from component 426 is at "on" voltage and when switch SW2 is closed, line 434 leading from component 426 is at "on" voltage.

The circuit above described operates as follows:

With both valve solenoids S1 and S2 de-energized and their valves shifted to closed position, switches SW1 and SW2 will be open. Under these conditions "on" voltage is supplied to all three input terminals of "and" component 408 so that this component, in turn, supplies "on" voltage via connection 436 to component 414. Component 414 of the sealed type, as indicated by connection 438, so that once it is turned on, it will remain in "on" condition even though the signal in connection 436 is interrupted.

The other input terminal of "and" component 414 is also supplied with "on" voltage from switch LS1, which is closed with the press at the top of the stroke, and component 414 therefore supplies "on" voltage to the one terminal of the "and" component 410.

Upon depressing switches 402 and 404, the circuit to the other terminal of "and" component 410 is completed and this unit will turn on and thereby turn on valve amplifiers 420 and 422, thereby energizing valve solenoids S1 and S2 and cause shifting of the pertaining valves.

A single amplifier would accomplish the energization of both valve solenoids by the provision of the connection dotted in at 440.

The actuation of switches 402 and 404 turns off "and" component 408 because the signal to the one terminal thereof is interrupted. This will turn off the signal in connection 436 but "and" component 414 remains on because of the seal at 438.

After the press starts its cycle, switch LS2 will close and supply a signal to one input terminal of "and" component 418. If both valves have shifted properly, pertaining switches SW1 and SW2 will be actuated, and this will provide signals in wires 430 and 434 and "and" component 418 will thus be turned on and supply "on" voltage via wire 442 to maintain amplifiers 420 and 422 turned on.

After switch LS2 has closed, switch LS1 will open and thereby turn off component 414, which will, in turn, turn off component 410, but this will be without effect because amplifiers 420 and 422 will at this time be held by the output from component 418.

The aforementioned shifting of switches SW1 and SW2 will also interrupt the "on" signals in wires 428 and 432, but this is without effect at this time because component 408 was turned off at the time of actuating switches 402 and 404.

The press now continues its cycle, and toward the end of the retracting movement of the slide, switch LS2 is opened, thereby turning off component 418 which, in turn, turns off amplifiers 420 and 422 to de-energize solenoids S1 and S2 thereby to stop the press. At the top of the stroke switch LS1 is closed.

If the valves have operated correctly, components 408 and 414 will again be turned on so that component 410 can again be turned on by actuating switches 402 and 404. If either valve has failed to shift properly, or if any component has failed, the press cannot be re-cycled.

It will be appreciated that all control currents in the control system are quite small, and that the valve switches will last for an indefinite length of time and will be quite certain in operation.

The circuit of FIGURE 9 is substantially identical with that of FIGURE 8 except that each valve solenoid has its own control system complete in itself including all of the aforementioned components. Thus every component in the circuit is duplicated with the exception of the amplifiers 420 and 422 and the valve switch operated components 424 and 426. The same arrangement of manual switches 402 and 404, and the same limit switches LS1 and LS2 are employed. As to the other components of the circuit, the same reference numerals are applied thereon except that those components pertaining to valve solenoid S1 have a subscript A, and those pertaining to valve solenoid S2 have a subscript B.

As to the manner of obtaining signals for components 424 and 426, there are many arrangements that can be arrived at so that the position of the pertaining valve switch will produce a signal.

Figure 10:
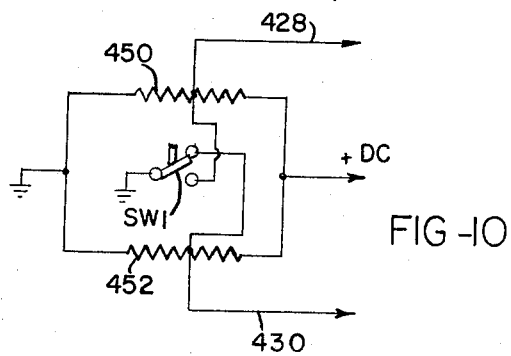
FIGURE 10 is a schematic representation of a component of the circuits of FIGURES 8 and 9 showing how actuation of the valve switch can establish signals for the elements of the logic circuits.

FIGURE 10 shows one extremely simple way of accomplishing this by connecting a direct current source via resistances 450 and 452 with ground. Connected to these resistances are the wires that carry the signals, for example, wires 428 and 430. The point of connection of these wires to their respective resistances are connected to terminals of the pertaining valve switch SW1 the blade of which is connected to ground. When this switch is in its upper position wire 428 is at "on" voltage, whereas when the switch is moved downwardly, wire 428 is connected to current and wire 430 will be at "on" voltage. The amount of current flowing in the blade of the switch can, of course, be extremely minute.

It will be seen that the circuits of FIGURES 8 and 9, based on logic components, will carry out the same functions as the circuits previously described and will provide for the same safety of operation of the system, and will maintain the currents in the control system, other than the currents to the valve solenoids extremely small at all times.

It will be understood that this invention is susceptible to modifications in order to adapt it to different usages and conditions, and accordingly, it is desired to comprehend such modifications within this invention as may fall within the scope of the appended claims.

I claim:

1. In a dual valve arrangement having valve body means having an inlet port, a service port, and an outlet port, and a pair of valve members therein, said valve members being spring urged toward a first position wherein either establishes a passage from the service port and being shiftable into a second position which both of the valve members must occupy to establish a passage from the inlet port to the service port, electric operators for the respective valve members energizable for shifting said valve members into their said second position, circuit means operable when completed for energizing said electrical operators, a relay for each valve member and having an actuating coil, a normally closed blade operably controlled by a respective relay and serially connected in said circuit, and means for energizing said relays in response to movement of the respective valve members into their said second positions and for de-energizing said relays in response to movement of the respective valve member into their said first position, said means comprising an oscillatory circuit in which each relay coil is connected, a transistor respectively controlling each oscillatory circuit, and a differential transformer respectively connected to each transistor for normally biasing the transistor to cut-off, said transformers being located in the valve body means and sensitive to movement of its respective valve member toward its second position for causing the respective transistor to conduct and commence oscillation of its respective circuit, and thereby energize the respective relay coil.

2. In a press; a clutch adjustable to control the operation of the press, a fluid operable actuator for the clutch, a source of fluid under pressure, a plurality of valve means interposed between the said source and the said fluid operable actuator for the clutch, each said valve means having an exhaust passage extending from said fluid operable actuator therethrough to exhaust, a pressure passage extending from said source through said plurality of valve means in series to said fluid operable actuator, a valve member pertaining to each said valve means, each said valve member being spring biased toward position to establish the exhaust passage therethrough, an actuator for each valve member energizable for shifting the pertaining valve member into position to interrupt the exhaust passage through the pertaining valve means and to establish the said pressure passage therethrough whereby any of the valve members when shifted under the influence of said spring means will interrupt the said pressure passage and establish an exhaust passage, a single energizing circuit for energizing said actuator means, means operable by the press for interrupting said energizing circuit upon the completion of a working cycle of a press, and means directly sensitive to the position of each said valve member operable for preventing establishing of said energizing circuit following the said interruption thereof upon the failure of any of said valve members to return to the position in which the exhaust passage therethrough is established, said means comprising a proximity detector in the valve body sensitive to the position of the pertaining valve member.

3. In a dual valve arrangement having valve body means having an inlet port, a service port, and an outlet port, and a pair of valve members therein, said valve members being spring urged toward a first position wherein either establishes a passage from the service port and being shiftable into a second position which both of the valve members must occupy to establish a passage from the inlet port to the service port, electric operators for the respective valve members energizable for shifting said valve members into their said second position, circuit means operable when completed for energizing said electrical operators, a relay for each valve member and having an actuating coil, a normally closed blade operably controlled by a respective relay and serially connected in said circuit, the improvement characterized by means for energizing said relays in response to movement of the respective valve members into their said second positions and for de-energizing said relays in response to movement of the respective valve member into their said first position, said means comprising an oscillatory circuit pertaining to each relay and each relay coil being connected into the pertaining oscillatory circuit so as to energize the relay when the circuit oscillates, and means sensitive to the movement of the pertaining valve member into the said second position for causing the pertaining oscillatory circuit to oscillate, said means sensitive to said movement of the valve member comprising a differential transformer mounted in the valve body and positioned to be influenced by movement of the valve member into said second position, said differential transformer being connected into said oscillatory circuit and being operative to cause oscillation when so influenced by said valve member.

4. In a press; a clutch adjustable to control the operation of the press, a fluid operable actuator for the clutch, a source of fluid under pressure, a plurality of valve means interposed between the said source and the said fluid operable actuator for the clutch, each said valve means having an exhaust passage extending therethrough, a pressure passage extending from said source through said plurality of valve means to said fluid operable actuator, a valve member pertaining to each said valve means, each said valve member being spring biased toward a first position to establish the exhaust passage through the pertaining valve means, the improvement comprising an electrical actuator for each valve member energizable for shifting the pertaining valve member into a second position to interrupt the exhaust passage through the pertaining valve means and to establish the said pressure passage therethrough whereby any of the valve members when shifted under the influence of said spring means in said first position will interrupt the said pressure passage and establish an exhaust passage, valve operated switch means having first and second positions corresponding to the first and second positions of said valve members, control switch means having a first position and being operable into a second position to initiate a press cycle, and logic circuit components connected on the one hand to said electrical actuators and on the other hand to said valve switch means and said control switch means and operable for effecting energization of said electrical actuators only when said valve members are in their first position and said control switch means is actuated into its second position.

5. In a press; a clutch adjustable to control the operation of the press, a fluid operable actuator for the clutch, a source of fluid under pressure, a plurality of valve means interposed between the said source and the said fluid operable actuator for the clutch, each said valve means having an exhaust passage extending therethrough, a pressure passage extending from said source through said plurality of valve means to said fluid operable actuator, a valve member pertaining to each said valve means, each said valve member being spring biased toward a first position to establish the exhaust passage through the pertaining valve means, the improvement comprising an electrical actuator for each valve member energizable for shifting the pertaining valve member into a second position to interrupt the exhaust passage through the pertaining valve means and to establish the said pressure passage therethrough whereby any of the valve members when shifted under the influence of said spring means in said first position will interrupt the said pressure passage and establish an exhaust passage, valve operated switch means having first and second positions corresponding to the first and second positions of said valve members, control switch means having a first position and being operable into a second position to initiate a press cycle, and logic circuit components connected on the one hand to said electrical actuators and on the other hand to said valve switch means and said control switch means and operable for effecting energization of said electrical actuators only when said valve members are in their first position and said control switch means is actuated into its second position, press operated switches connected to said logic circuit components and means under the control of said press operated switches for maintaining the energization of said electrical actuators during a press cycle and following the return of said control switch means to said first position thereof.

6. In a press; a clutch adjustable to control the operation of the press, a fluid operable actuator for the clutch, a source of fluid under pressure, a plurality of valve means interposed between the said source and the said fluid operable actuator for the clutch, each said valve means having an exhaust passage extending therethrough, a pressure passage extending from said source through said plurality of valve means to said fluid operable actuator, a valve member pertaining to each said valve means, each said valve member being spring biased toward a first position to establish the exhaust passage through the pertaining valve means, the improvement comprising an electrical actuator for each valve member energizable for shifting the pertaining valve member into a second position to interrupt the exhaust through the pertaining valve means and to establish the said pressure passage therethrough whereby any of the valve members when shifted under the influence of said spring means in said first position will interrupt the said pressure passage and establish an exhaust passage, a valve switch for each valve operated by the respective valve member having a first position when the pertaining valve member is in its first position and a second position when the pertaining valve member is in its second position, control switch means having a normal first position and being operable into a second position to initiate a press cycle, press operated switches each having a first position when the press is in retracted position and a second position during a press cycle, and logic circuit components connected on the one hand to said electrical actuators and on the other hand to said valve switches and said control switch means and said press operated switches and operable for effecting energization of said electrical actuators only when said valve switches are in their first position and at least one of said press operated switches is in its first position and said control switch means is actuated to the said second position thereof, another of said press operated switches being operable when in its second position and said valve switches are in their second position to maintain energization of said electrical actuators after the press has commenced its cycle and upon return of said control switch means to said first position thereof.

7. An arrangement according to claim 6 in which said logic circuit components comprise a first "and" component adapted to be turned on in response to signals from said valve switches in their first position and said control switch means in its first position, a second "and" component adapted to be turned on in response from a signal from said first "and" component and from said one press operated switch, and a third "and" component having its output connected to control said actuators and adapted to be turned on in response to a signal from the output of said second "and" component and from said control switch means when moved to its said second position.

8. An arrangement according to claim 6 in which said logic circuit components comprise a first "and" component adapted to be turned on in response to signals from said valve switches in their first position and said control switch means in its first position, a second "and" component adapted to be turned on in response from a signal from said first "and" component and from said one press operated switch, and a third "and" component having its output connected to control said actuators and adapted to be turned on in response to a signal from the output of said second "and" component and from said control switch means when moved to its said second position, said second "and" component having a seal pertaining to the input thereof connected to the output of said first "and" component whereby said second "and" component remains turned on when the valve switches move to their said second position.

9. An arrangement according to claim 6 in which said logic circuit components comprise a first "and" component adapted to be turned on in response to signals from said valve switches in their first position and said control switch means in its first position, a second "and" component adapted to be turned on in response from a signal from said first "and" component and from said one press operated switch, and a third "and" component having its output connected to control said actuators and adapted to be turned on in response to a signal from the output of said second "and" component and from said control switch means when moved to its said second position, said second "and" component having a seal pertaining to the input thereof connected to the output of said first "and" component whereby said second "and" component remains turned on when the valve switches move to their said second position, and a fourth "and" component having its output connected to effect energization of said electrical actuators and adapted for being turned on in response to signals from said valve switches when moved to their second position and from a second one of said press operated switches when in its second position.

10. An arrangement according to claim 6 in which said logic circuit components comprise a first "and" component pertaining to each valve means and adapted to be turned on in response to signals from said valve switches in their first position and said control switch means in its first position, a second "and" component pertaining to each valve means and adapted to be turned on in response from a signal from the pertaining said first "and" component and from said one press operated switch, and a third "and" component pertaining to each valve means and having its output connected to control said actuators and adapted to be turned on in response to a signal from the output of said pertaining second "and" component and from said control switch means when moved to its said second position, said second "and" component having a seal pertaining to the input thereof connected to the output of the pertaining said first "and" component whereby said second "and" component remains turned on when the valve switches move to their said second position, and a fourth "and" component pertaining to each valve means and having its output connected to effect energization of said electrical actuators and adapted for being turned on in response to signals from said valve switches when moved to their second position and from a second one of said press operated switches when in its second position.

References Cited by the Examiner
UNITED STATES PATENTS

| | | | |
|---|---|---|---|
| 2,636,581 | 4/1953 | Bitler | 192—144 |
| 2,966,979 | 1/1961 | Zarling | 192—131 |
| 3,004,647 | 10/1961 | Andrus et al. | 192—129 |
| 3,135,289 | 6/1964 | Jordan | 137—596.16 |

DAVID J. WILLIAMOWSKY, *Primary Examiner.*